(12) United States Patent
Li et al.

(10) Patent No.: US 11,238,261 B2
(45) Date of Patent: Feb. 1, 2022

(54) ULTRASONIC FINGERPRINT RECOGNITION METHOD, DEVICE AND SYSTEM, DISPLAY DEVICE AND STORAGE MEDIUM

(71) Applicant: BOE TECHNOLOGY GROUP CO., LTD., Beijing (CN)

(72) Inventors: Xiufeng Li, Beijing (CN); Haisheng Wang, Beijing (CN); Xiaoliang Ding, Beijing (CN); Pengpeng Wang, Beijing (CN); Yuzhen Guo, Beijing (CN); Lijun Zhao, Beijing (CN); Chenyang Zhang, Beijing (CN); Yaqian Ji, Beijing (CN); Yanling Han, Beijing (CN); Peixiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/914,673

(22) Filed: Jun. 29, 2020

(65) Prior Publication Data
US 2021/0192167 A1  Jun. 24, 2021

(30) Foreign Application Priority Data
Dec. 20, 2019 (CN) .......................... 201911327344.2

(51) Int. Cl.
*G06K 9/00* (2006.01)
*G06F 3/041* (2006.01)
*G06F 3/044* (2006.01)

(52) U.S. Cl.
CPC ......... *G06K 9/0002* (2013.01); *G06F 3/0446* (2019.05); *G06F 3/04144* (2019.05)

(58) Field of Classification Search
None
See application file for complete search history.

(56) References Cited

U.S. PATENT DOCUMENTS

| 2016/0114024 A1* | 4/2016 | Tanaka ...................... A23L 2/52 |
| | | 435/252.9 |
| 2017/0090028 A1* | 3/2017 | Djordjev ................. G01S 7/521 |
| 2019/0114027 A1 | 4/2019 | Tanaka et al. |

FOREIGN PATENT DOCUMENTS

| CN | 106794487 A | 5/2017 |
| CN | 106999985 A | 8/2017 |
| CN | 108140106 A | 6/2018 |
| CN | 109219817 A | 1/2019 |

* cited by examiner

*Primary Examiner* — Joseph R Haley
(74) *Attorney, Agent, or Firm* — Thomas | Horstemeyer, LLP (57) ABSTRACT

An ultrasonic fingerprint recognition module is described that includes sensing units distributed in the form of array, where the sensing units include: a receiving electrode layer having a plurality of receiving electrodes distributed in the form of array; a piezoelectric material layer disposed on one side of the receiving electrode layer; an emission electrode layer disposed on a side of the piezoelectric material layer distal to the receiving electrode layer, and including a plurality of rows of emission electrodes; a selection circuit having an input terminal which is connected with an excitation signal and an output terminal which is connected with the emission electrode for selecting to transmit the excitation signal to the plurality of emission electrodes; and a pixel receiving circuit connected to the receiving electrode layer that receives a fingerprint signal.

15 Claims, 8 Drawing Sheets

```
┌─────────────────────────────────────────────────────────────┐
│ Obtain a first fingerprint signal received by each of the   │   S510
│ sensing units in a current scanning line                    │
└─────────────────────────────────────────────────────────────┘
                              │
┌─────────────────────────────────────────────────────────────┐
│ According to the plurality of first fingerprint signals and │
│ a positional relationship between a target sensing unit and │
│ the remaining sensing units, separate an interference       │
│ fingerprint signal from the first fingerprint signal of the │   S520
│ target sensing unit, to obtain a second fingerprint signal, │
│ wherein the target sensing unit is any of the sensing units │
│ in the current scanning line, the remaining sensing units   │
│ are sensing units other than the target sensing unit in the │
│ current scanning line, and the interference fingerprint     │
│ signal is a fingerprint signal transmitted to the target    │
│ sensing unit from fingerprint areas corresponding to the    │
│ remaining sensing units                                     │
└─────────────────────────────────────────────────────────────┘
                              │
┌─────────────────────────────────────────────────────────────┐
│ Perform fingerprint recognition according to the second     │   S530
│ fingerprint signals received by the plurality of sensing    │
│ units                                                       │
└─────────────────────────────────────────────────────────────┘
```

| Obtain a first primary fingerprint signal, wherein the first primary fingerprint signal is a fingerprint signal transmitted to the target sensing unit from the fingerprint area corresponding to the target sensing unit | S810 |

| Obtain a first sub-fingerprint signal received by the remaining sensing units according to the positional relationship between the target sensing unit and the remaining sensing units, wherein the first sub-fingerprint signal is a fingerprint signal transmitted to the remaining sensing units from the fingerprint area corresponding to the target sensing unit | S820 |

| Determine the first fingerprint signal according to the first primary fingerprint signal and the first sub-fingerprint signal | S830 |

ULTRASONIC FINGERPRINT RECOGNITION METHOD, DEVICE AND SYSTEM, DISPLAY DEVICE AND STORAGE MEDIUM

CROSS-REFERENCE TO RELATED APPLICATIONS

The present application claims the benefit of and priority to Chinese Patent Application No. 201911327344.2 filed Dec. 20, 2019, the entire contents of which are incorporated herein by reference.

TECHNICAL FIELD

The present disclosure relates to display technology and, more particularly, to an ultrasonic fingerprint recognition method, device, and system, as well as a display device and a storage medium.

BACKGROUND

With the continuous development of science and technology, fingerprint recognition technology has been gradually applied to people's daily life. Fingerprint recognition technology can perform authentication by comparing detail feature points of different fingerprints so as to achieve the function of identification. Ultrasonic fingerprint recognition technology is one of the commonly used fingerprint recognition technologies.

Ultrasonic fingerprint recognition emits ultrasonic waves through a sensing unit and the ultrasonic waves are reflected to the sensing unit by the fingerprint. Then, the sensing unit judges a fingerprint area corresponding to the sensing unit by the reflected ultrasonic waves. When receiving the reflected ultrasonic waves, the sensing unit not only receives the ultrasonic wave reflected by the fingerprint area corresponding to the sensing unit, but also receives the ultrasonic waves reflected by other fingerprint areas, thus affecting the accuracy of the ultrasonic fingerprint recognition.

It should be noted that information disclosed in this part are provided only for acquiring a better understanding of the background of the present application and therefore, may include information that is not technology already known to those of ordinary skill in the art.

SUMMARY

According to an aspect of the present disclosure, an ultrasonic fingerprint recognition module is provided, comprising a plurality of sensing units distributed in the form of array, wherein the plurality of sensing units comprising:

a receiving electrode layer comprising a plurality of receiving electrodes distributed in the form of array;

a piezoelectric material layer disposed on one side of the receiving electrode layer;

an emission electrode layer disposed on a side of the piezoelectric material layer distal to the receiving electrode layer, and comprising a plurality of rows of emission electrodes;

a selection circuit having an input terminal which is connected with an excitation signal and an output terminal which is connected with the emission electrode for selecting to transmit the excitation signal to the plurality of emission electrodes; and a pixel receiving circuit connected to the receiving electrode layer to receive a fingerprint signal.

According to an embodiment of the present disclosure, each row of the emission electrodes is separated from each other and is corresponded with a plurality of the receiving electrodes, and each row of the emission electrodes shares electrode plates of a plurality of corresponding receiving electrodes.

According to an embodiment of the present disclosure, orthographic projections of a plurality of corresponding receiving electrodes on the piezoelectric material layer is within orthographic projection of each row of the emission electrodes.

According to an embodiment of the present disclosure, a width of each row of the emission electrodes is 50-200 μm, and an interval between each row of the emission electrodes and its adjacent row of the emission electrodes is 1-10 μm.

According to an embodiment of the present disclosure, the plurality of rows of emission electrodes are connected to the selection circuit in such a manner that connecting lines are leaded from the same side of the emission electrodes.

According to an embodiment of the present disclosure, the plurality of rows of emission electrodes are connected to the selection circuit in such a manner that connecting lines are leaded from left side or right side of the emission electrodes alternately.

According to an embodiment of the present disclosure, there is provided an ultrasonic fingerprint recognition method, using a plurality of sensing units to recognize fingerprints, the plurality of sensing units comprising a plurality of rows of separated emission electrodes and a plurality of receiving electrodes distributed array; the ultrasonic fingerprint recognition method comprising:

emitting ultrasonic waves by a scanning line in a row focused manner, the scanning line comprising a plurality of sensor units comprising a row of emission electrode and a plurality of receiving electrodes corresponding to the row of emission electrode;

receiving and recognizing the ultrasonic waves emitted by the scanning line in a column focused manner.

According to an embodiment of the present disclosure, receiving and recognizing the ultrasonic waves emitted by the scanning line in a column focused manner comprises:

obtaining a first fingerprint signal received by each of the sensing units in the scanning line;

separating an interference fingerprint signal from the first fingerprint signal of a target sensing unit according to the plurality of first fingerprint signals and a positional relationship between the target sensing unit and the remaining sensing units, to obtain a second fingerprint signal, wherein the target sensing unit is any of the sensing units in the scanning line, the remaining sensing units are sensing units other than the target sensing unit in the scanning line, and the interference fingerprint signal is a fingerprint signal transmitted to the target sensing unit from fingerprint areas corresponding to the remaining sensing units; and performing fingerprint recognition according to the second fingerprint signals received by the plurality of sensing units.

According to an embodiment of the present disclosure, separating the interference fingerprint signal from the first fingerprint signal of the target sensing unit according to the plurality of first fingerprint signals and the positional relationship between the target sensing unit and the remaining sensing units comprises:

separating the interference fingerprint signal from the first fingerprint signal of the target sensing unit according to the first fingerprint signal of the target sensing unit, a first fingerprint signal of a first remaining sensing unit and a positional relationship between the target sensing unit and the first remaining sensing unit, wherein the first remaining sensing unit is a sensing unit in the remaining sensing units, whose distance to the target sensing unit is less than a first preset threshold.

According to an embodiment of the present disclosure, the method further comprises:

obtaining a first primary fingerprint signal, wherein the first primary fingerprint signal is a fingerprint signal transmitted to the target sensing unit from a fingerprint area corresponding to the target sensing unit;

obtaining a first sub-fingerprint signal received by the remaining sensing units according to the positional relationship between the target sensing unit and the remaining sensing units, wherein the first sub-fingerprint signal is a fingerprint signal transmitted to the remaining sensing units from the fingerprint area corresponding to the target sensing unit; and determining the first fingerprint signal according to the first primary fingerprint signal and the first sub-fingerprint signal.

According to an embodiment of the present disclosure, obtaining the first sub-fingerprint signal according to the positional relationship between the target sensing unit and the remaining sensing units comprises:

determining a receiving delay of the remaining sensing units according to the positional relationship between the target sensing unit and the remaining sensing units; and obtaining the first sub-fingerprint signal after receiving delay receiving delay of the first primary fingerprint signal.

According to an embodiment of the present disclosure, determining the first fingerprint signal according to the first primary fingerprint signal and the first sub-fingerprint signal comprises:

superposing the first primary fingerprint signal and the plurality of first sub-fingerprint signals to obtain the first fingerprint signals.

According to an embodiment of the present disclosure, receiving the first sub-fingerprint signal according to the positional relationship between the target sensing unit and the remaining sensing units comprises:

obtaining a first sub-fingerprint signal of a second remaining sensing unit according to a positional relationship between the target sensing unit and the second remaining sensing unit, wherein the second remaining sensing unit is a sensing unit in the remaining sensing units, whose distance to the target sensing unit is less than a second preset threshold.

According to an embodiment of the present disclosure, emitting ultrasonic waves by a scanning line in a row focused manner comprises:

controlling an auxiliary scanning line to emit a first ultrasonic signal; and controlling the scanning line to emit a second ultrasonic signal according to a positional relationship between the auxiliary scanning line and the scanning line, so that the first ultrasonic signal and the second ultrasonic signal reach a fingerprint area corresponding to the scanning line simultaneously, wherein the auxiliary scanning line is a scanning line, whose distance to the scanning line is less than a third preset threshold.

According to an embodiment of the present disclosure, controlling the scanning line to emit the second ultrasonic signal according to the positional relationship between the scanning line and the auxiliary scanning line comprises:

determining propagation delay of the auxiliary scanning line for emitting the first ultrasonic wave according to the positional relationship between the scanning line and the auxiliary scanning line; and controlling the scanning line to emit the second ultrasonic signal according to the propagation delay of the auxiliary scanning line for emitting the first ultrasonic wave.

According to an aspect of the present disclosure, there is provided an ultrasonic fingerprint recognition system, comprising the above ultrasonic fingerprint recognition module the ultrasonic fingerprint recognition system further comprises:

an obtaining circuit connected to the ultrasonic fingerprint recognition module and configured to obtain a first fingerprint signal received by each of the sensing units in a scanning line;

a separation circuit connected to the obtaining circuit and configured to, according to the plurality of first fingerprint signals and a positional relationship between a target sensing unit and the remaining sensing units, separate an interference fingerprint signal from the first fingerprint signal of the target sensing unit to obtain a second fingerprint signal, wherein the target sensing unit is any of the sensing units in the scanning line, the remaining sensing units are sensing units other than the target sensing unit in the scanning line, and the interference fingerprint signal is a fingerprint signal transmitted to the target sensing unit from fingerprint areas corresponding to the remaining sensing units;

a recognition circuit connected to the separation circuit and configured to perform fingerprint recognition according to the second fingerprint signals received by the plurality of sensing units.

It is to be understood that both the foregoing general description and the following detailed description are exemplary and explanatory only and are not restrictive of the invention, as claimed.

BRIEF DESCRIPTION OF THE DRAWINGS

The above-mentioned and other features and advantages of the present disclosure will become more apparent from the detailed descriptions of exemplary embodiments by reference to the accompanying drawings.

DETAILED DESCRIPTION

Exemplary embodiments will now be described more fully by reference to the accompanying drawings. However, the exemplary embodiments can be implemented in various forms and should not be understood as being limited to the examples set forth herein; rather, these embodiments are provided so that this disclosure will be thorough and complete, and the conception of exemplary embodiments will be fully conveyed to those skilled in the art. The same reference numerals in the drawings refer to same or similar parts, and the repeated descriptions thereof will be omitted.

Furthermore, the described features, structures or characteristics may be combined in one or more embodiments in any appropriate way. In the description below, many specific details are provided for fully understanding embodiments of the present disclosure. However, it will be appreciated by those skilled in the art that technical solutions of the present disclosure can be practiced with one or more of the specific details, or, other methods, components, materials, devices, and steps may be used. Under other circumstances, well-known structures, methods, devices, implementations, materials, or operations will not be illustrated or described in detail, to avoid obscuring various aspects of the present disclosure.

Block diagrams shown in the drawings are only functional entities, and not necessarily corresponds to physically independent entities. That is, the functional entities may be implemented in the form of software; or the functional entities or part of the functional entities may be implemented in one or more software hardened modules; or the functional entities may be implemented in different networks and/or processor devices and/or microcontroller devices.

Figure 1:
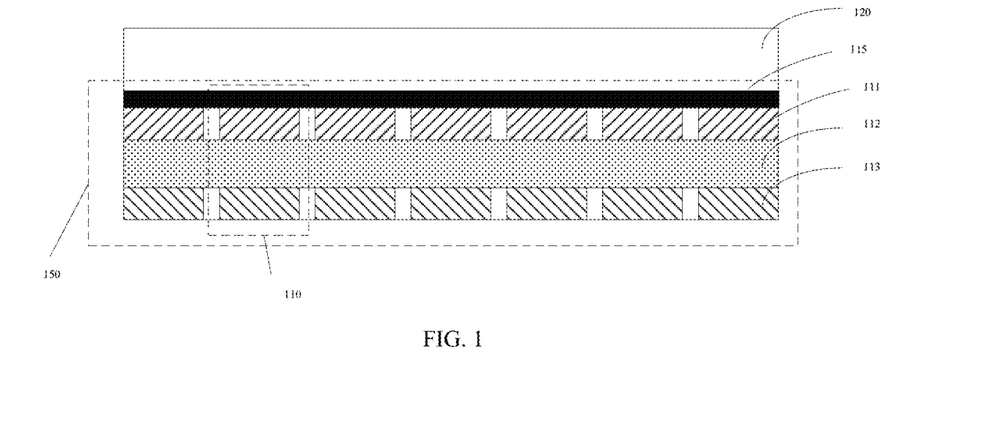
FIG. 1 is a structural schematic diagram of a sensing unit provided by an exemplary embodiment of the present disclosure.
Figure 2:
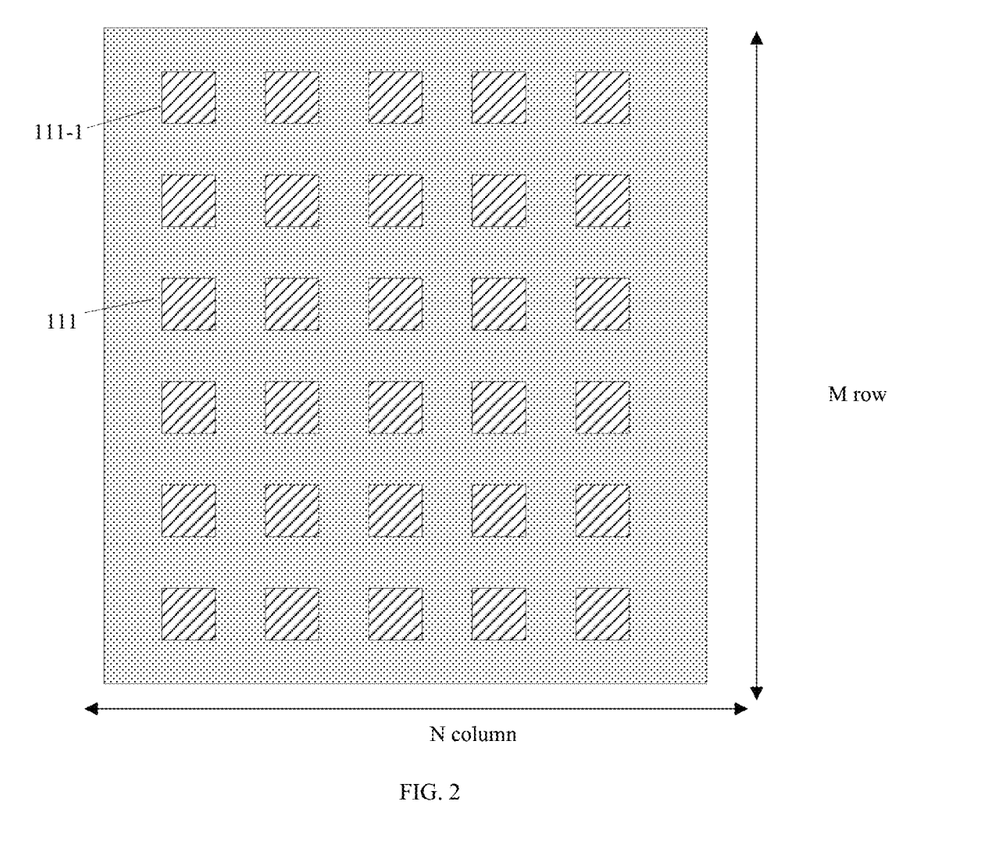
FIG. 2 is a top view diagram of a receiving electrode provided by an exemplary embodiment of the present disclosure.
Figure 3:
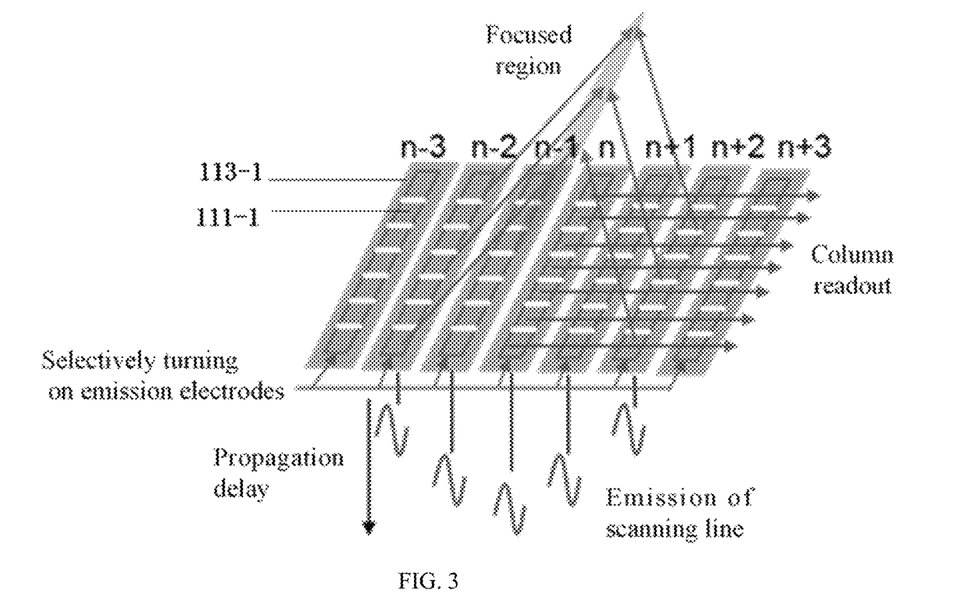
FIG. 3 is a top view diagram of an emission electrode and a receiving electrode provided by an exemplary embodiment of the present disclosure.

An embodiment of the present disclosure provides an ultrasonic fingerprint recognition module. As shown in FIG. 1, the ultrasonic fingerprint recognition module 150 may include a plurality of sensing units 110 distributed in array. The plurality of sensing units include a receiving electrode layer 111, a piezoelectric material layer 112, an emission electrode layer 113, a pixel receiving circuit 115, and a selection circuit 130. The emission electrode layer 113 includes a plurality of rows of emission electrodes 113-1 separated from each other. The receiving electrode layer 111 includes a plurality of receiving electrodes 111 distributed in the form of array (as shown in FIG. 2), and each of the receiving electrodes 111 is connected with a pixel receiving circuit 115. As shown in FIG. 3, the plurality of receiving electrodes 111 is disposed in array. The plurality of emission electrodes 113-1 are disposed in the form of a row. Each row of emission electrodes includes an integral emission electrode 113-1, and each row of emission electrodes 113-1 has a certain interval from its adjacent row of emitter electrodes 113-1. Each row of the emission electrodes corresponds to a plurality of the receiving electrodes, and each row of the emission electrodes shares electrode plates of the plurality of corresponding receiving electrodes. A width of each row of the emission electrodes is 50-200 μm, and an interval between each row of the emission electrodes and its adjacent row of the emission electrodes is 1-10 μm. The orthographic projections of a plurality of corresponding receiving electrodes on the piezoelectric material layer is within an orthographic projection of each row of the emission electrodes.

One receiving electrode 111-1, the emission electrode 113-1, and piezoelectric material layer 112 corresponding to said one receiving electrode 111-1, and the pixel receiving circuit 115 constitute a sensing unit. The ultrasonic recognition module includes a plurality of said sensing units disposed in array.

A cover plate 120 is disposed on a side of the receiving electrode layer 111 distal to the piezoelectric layer 112. In general, during fingerprint recognition, a fingerprint is often placed on a surface of the cover plate 120. Namely, an ultrasonic wave passes through the cover plate to reach the fingerprint of a user attached to the surface of the cover plate.

The ultrasonic recognition module includes the selection circuit 130. Multiple rows of emission electrodes are connected with an output terminal of the selection circuit MUX 130. An input terminal of the selection circuit 130 is connected with an excitation signal. The selection circuit is selectively turned on one or several rows of the emission electrodes according to a selection control command, and transmits the corresponding excitation signal to the emission electrode. The excitation signal excites the sensing unit to emit an ultrasonic signal. During ultrasonic fingerprint recognition, the sensing units may emit an ultrasonic wave by line-by-line scanning or multi-line scanning.

Figure 4:
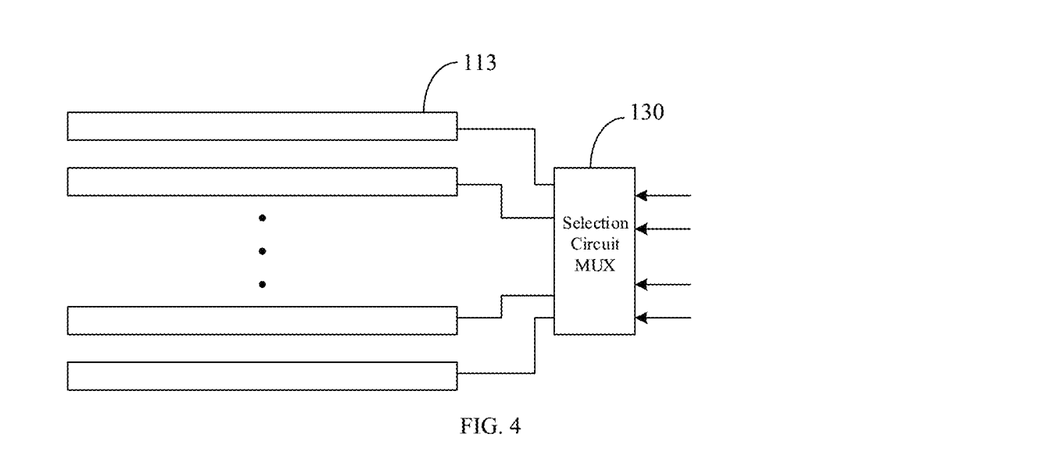
FIG. 4 is a diagram of an emission electrode provided by an exemplary embodiment of the present disclosure.

FIG. 4 shows a connection mode in which the emission electrode 113-1 is connected to the selection circuit MUX 130. A plurality of rows of emitter electrodes are connected to the selection circuit MUX 130 by connecting lines leading from the right side thereof.

Figure 5:
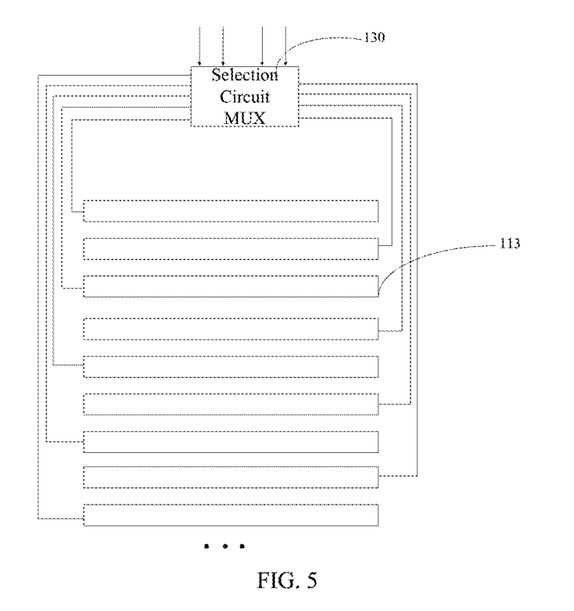
FIG. 5 is another diagram of an emission electrode provided by an exemplary embodiment of the present disclosure.

The emission electrode may be connected to the selection circuit MUX 130 in another lead-out manner. As shown in FIG. 5, connecting lines are leaded from a plurality of rows of emitter electrodes alternately on the left and right sides thereof. The emitter electrodes of the first row are connected to the selection circuit MUX 130 by the connecting lines leading from the left side thereof, the emitter electrodes of second first row are connected to the selection circuit MUX 130 by the connecting lines leading from the right side thereof, the emitter electrodes of the third row are connected to the selection circuit MUX 130 by the connecting lines lead from the left side thereof, the emitter electrodes of fourth first row are connected to the selection circuit MUX 130 by the connecting lines leading from the right side thereof, and so on. This lead-out manner can increase the spacing of the connecting lines, making it easier to implement in the process.

Referring again to FIG. 3, the ultrasonic fingerprint recognition module provided by the present disclosure performs ultrasonic transmission in a row focused manner. Each row of the emission electrode is an integral emission electrode, and the phase of the excitation voltage is controlled in units of rows to realize the control of ultrasonic waves.

A multiplexer can be used to control a polarity of rows of emission electrodes to emit ultrasonic waves. For example, the (n−2)th row of emission electrodes and (n+2)th row of emission electrodes are first gatedhen, the (n−1)th row of emission electrodes and (n+1)th row of emission electrodes are gated and then, the nth row of emission electrodes gate Row as well. The propagation delay of the (n−2)th row of emission electrodes and (n+2)th row is greater than the propagation delay of the (n−1)th row of emission electrodes and (n+1)th row of emission electrodes. Also, the propagation delay of the (n−1)th row of emission electrodes and (n+1)th row of emission electrodes is greater than the propagation delay of the nth row of emission electrodes. That is, the time required for the ultrasonic waves emitted by the (n−2)th row of emission electrodes and (n+2)th row of emission electrodes to reach the fingerprint recognition area is longer than the time required for the ultrasonic waves emitted by the (n−1)th row of emission electrodes and (n+1)th row of emission electrodes to reach the fingerprint recognition area (that is, the area above the nth row), and the time required for the ultrasonic waves emitted by the (n−1)th row of emission electrodes and (n+1)th row of emission electrodes to reach the fingerprint recognition area is longer than the time required for the ultrasonic waves emitted by the nth row of emission electrodes to reach the fingerprint recognition area. The transmission delay time may be calculated according to the principle of equal sound path and controlling the gate time of the (n−2)th row of emission electrodes and (n+2)th row of emission electrodes, the (n−1)th row of emission electrodes and (n+1)th row of emission electrodes, and the nth row of emission electrodes. The ultrasonic waves emitted by the (n−2)th row of emission electrodes and (n+2)th row of emission electrodes, the (n−1)th row of emission electrodes and (n+1)th row of emission electrodes and the nth row of emission electrodes are focused on the area above the nth row.

For example, in the case where an organic light-emitting diode (OLED) screen and the excitation signal of 10 MHz are used, 15~30 electrodes may be simultaneously controlled. The delay time is about 5~100 ns, and the beam width is focused within 150 μm. Where different rows of emitter electrodes are gated at different times, the vibration intensity of the focus area is increased by 1-5 times as compared to equal phase emission (the emitter electrodes are not divided, and all emitter electrodes are gated at the same time), and a valley-ridge contrast is increased by 1-5 times since crosstalk between lines is weakened.

Exemplary embodiments of the present disclosure provide an ultrasonic fingerprint recognition method for a display device that employs the above-mentioned ultrasonic fingerprint recognition module to perform fingerprint identification using multiple rows of separated emission electrodes and array-distributed receiving electrodes. The ultrasonic fingerprint recognition method includes emitting ultrasonic waves by a scanning line in a row focused manner and receiving and recognizing the ultrasonic waves emitted by the scanning line in a column focused manner.

Referring to FIGS. 6-11, the ultrasonic fingerprint recognition module provided by the present disclosure performs ultrasonic wave receiving in a column focused manner.

Figure 6:
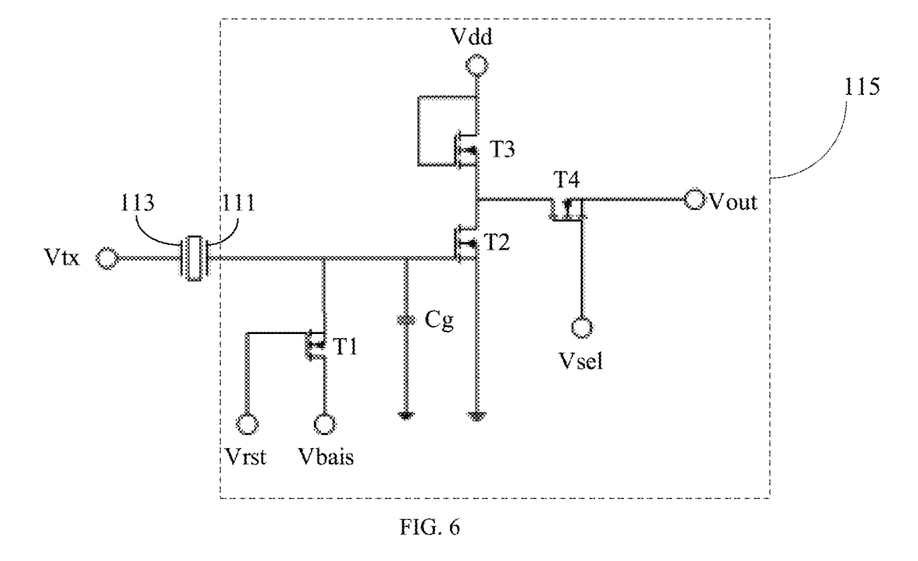
FIG. 6 is a circuit diagram of a pixel receiving circuit provided by an exemplary embodiment of the present disclosure.

The receiving electrode 111-1 is connected to the pixel receiving circuit 115. As shown in FIG. 6, the pixel receiving circuit includes a first transistor T1, a second transistor T2, a third transistor T3, a fourth transistor T4, and an energy-storage capacitor Cg. A first terminal of the first transistor T1 is connected to the receiving electrode 111, a second terminal of the first transistor T1 is connected to a bias signal Vbais, and a control terminal T1 of the first transistor T1 is connected to a sampling control signal Vrst. A control terminal of the second transistor T2 is connected to the second terminal of the first transistor T1, a first terminal of the second transistor T2 is connected to a second terminal of the third transistor T3, and a second terminal of the second transistor T2 is connected to a second power supply. A first terminal and a control terminal of the third transistor T3 are connected to a first power supply Vdd. A first terminal of the fourth transistor T4 is connected to the second terminal of the third transistor T3, a second terminal of the fourth transistor T4 is connected to a signal output terminal Vout, and a control terminal of the fourth transistor T4 is connected to an output control signal Vsel. A first terminal of the energy-storage capacitor Cg is connected to the control terminal of the second transistor T2 and the second terminal of the second transistor T2 is connected to a second power supply terminal.

Figure 7:
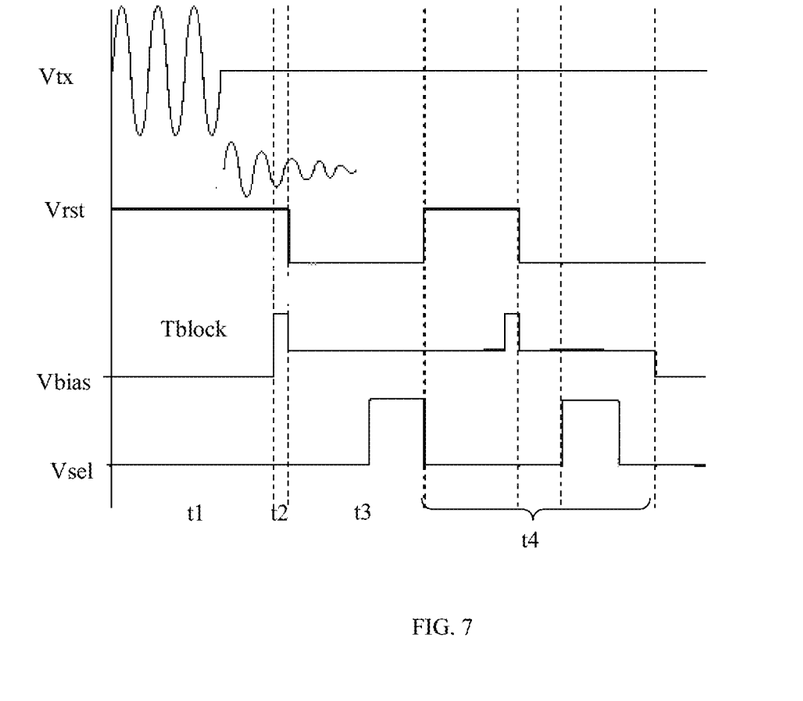
FIG. 7 is a drive sequence diagram of a pixel receiving circuit provided by an exemplary embodiment of the present disclosure.

Descriptions will be made by way of example, in which the transistors are N-type transistors. Referring to a sequence diagram of the pixel receiving circuit shown in FIG. 7, working processes of the pixel receiving circuit are described as follows:

At the t1 stage, the emission electrode 113 receives an excitation signal Vtx and the sensing unit emits an ultrasonic wave under the action of the excitation signal Vtx. The sampling control signal Vrst is at a high level, so the first transistor T1 is turned on. The bias signal Vbais is at a low level so the second transistor T2 is turned off under the action of the bias signal Vbais, and no signal is outputted from the signal output terminal.

At the t2 stage, the sampling control signal Vrst is at a high level, so the first transistor T1 is turned on. The bias signal is at a high level, a fingerprint signal received by the receiving electrode is written to the energy-storage capacitor, and the output control signal Vbais is at a low level. The fourth transistor T4 is turned off and no signal is outputted from the signal output terminal.

At the t3 stage, the sampling control signal Vrst is at a low level so the first transistor T1 is turned off. The second transistor T2 is turned on under the drive of a signal in the energy-storage capacitor. The output control signal Vsel is switched to be at a high level and, at this time, a signal at the first terminal of the second transistor T2 is transmitted to the signal output terminal, that is, the fingerprint signal is amplified and then outputted.

At the t4 stage, the t4 stage is a signal acquisition process during a stage of scanning other lines. That is, when the other lines are scanned, an ultrasonic wave of the other lines is reflected to a line and is received by the pixel receiving circuit of the line.

During fingerprint recognition, the user's finger is placed on a light-exiting surface of the display device and there is a fixed distance between the user's finger (i.e., the light-exiting surface of the display device) and the sensing unit.

Figure 8:
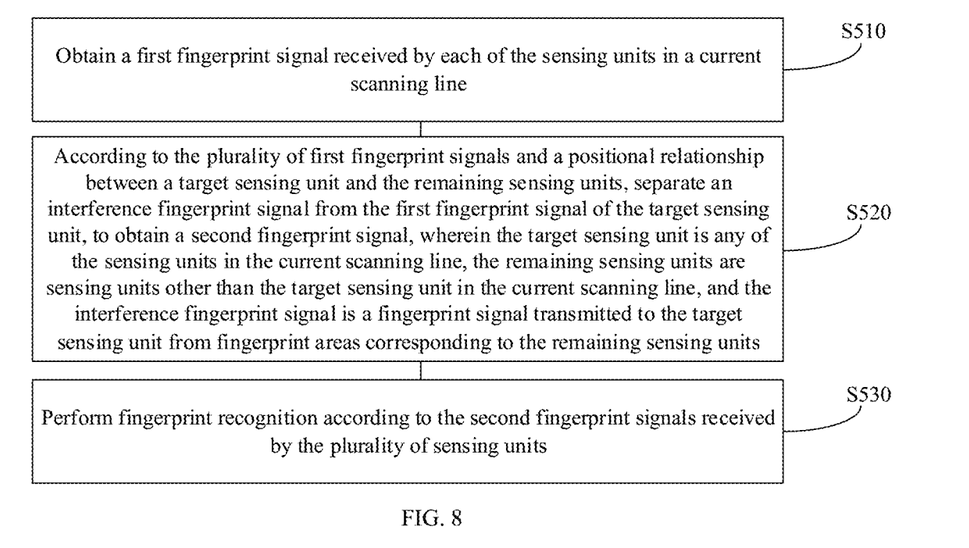
FIG. 8 is a flow chart of a first ultrasonic fingerprint recognition method provided by an exemplary embodiment of the present disclosure.

As shown in FIG. 8, the method of the receiving and recognizing of ultrasonic waves in a column focused manner may include the following steps.

In step S510, a first fingerprint signal received by each of the sensing units in a scanning line is obtained.

In step S520, according to the plurality of first fingerprint signals and a positional relationship between a target sensing unit and the remaining sensing units, an interference fingerprint signal is separated from the first fingerprint signal of the target sensing unit, to obtain a second fingerprint signal. The target sensing unit is any of the sensing units in the scanning line. The remaining sensing units are sensing units other than the target sensing unit in the scanning line. The interference fingerprint signal is a fingerprint signal transmitted to the target sensing unit from fingerprint areas corresponding to the remaining sensing units.

In step S530, fingerprint recognition is performed according to the second fingerprint signals received by the plurality of sensing units.

In the fingerprint recognition method provided by the embodiment of the present disclosure, the first fingerprint signal received by each of the sensing units in the scanning line is obtained. According to the plurality of first fingerprint signals and the positional relationship between the target sensing unit and the remaining sensing units, the interference fingerprint signal is separated from the first fingerprint signal of the target sensing unit to obtain the second fingerprint signals. Further, the fingerprint recognition is performed according to the second fingerprint signals received by the plurality of sensing units. Therefore, an ultrasonic wave reflected to the target sensing unit from other areas is separated from the ultrasonic signal received by the sensing units, which reduces the influence of the ultrasonic wave reflected from other areas on a recognition result and improves the accuracy of ultrasonic fingerprint recognition.

In step S510, the first fingerprint signal received by each of the sensing units in the scanning line may be obtained.

Figure 9:
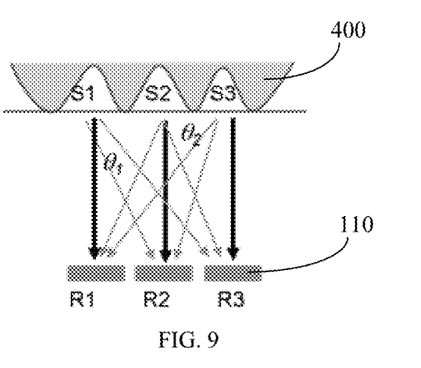
FIG. 9 is a diagram of the reflection of an ultrasonic wave provided by an exemplary embodiment of the present disclosure.

The first fingerprint signals received by the sensing units refer to a fingerprint signal outputted from the pixel receiving circuit to which each of the sensing units is connected. As shown in FIG. 9, the reference sign 110 denotes a sensing unit and the reference sign 400 denotes a finger. The first fingerprint signal includes an electrical signal converted from an effective ultrasonic wave and an ineffective ultrasonic wave. The effective ultrasonic wave refers to an ultrasonic wave reflected by a fingerprint area corresponding to the target sensing unit (an orthographic projection area of the sensing unit on a fingerprint recognition surface of the display device). An interference ultrasonic wave refers to an ultrasonic wave reflected to the target sensing unit by orthographic projection areas of the remaining sensing units in the fingerprint areas.

In step S520, according to the plurality of first fingerprint signals and the positional relationship between the target sensing unit and the remaining sensing units, the interference fingerprint signal is separated from the first fingerprint signal of the target sensing unit to obtain the second fingerprint signal.

The target sensing unit is any of the sensing units in the scanning line. The remaining sensing units are sensing units other than the target sensing unit in the scanning line. The interference fingerprint signal is a fingerprint signal transmitted to the target sensing unit from fingerprint areas corresponding to the remaining sensing units.

An ultrasonic wave received by any of the sensing units includes both an effective ultrasonic wave and an ineffective ultrasonic wave, which are converted into the first fingerprint signal by the sensing unit together. There is a delay between the transmission of the interference ultrasonic wave to the target sensing unit and the transmission of the effective ultrasonic wave to the target sensing unit. Accordingly, a phase θ corresponding to the interference ultrasonic wave may be obtained. Since the sensing units are uniformly distributed in array in the display device, the ineffective ultrasonic waves with the same relative positions have identical phases. The fingerprint signal converted from the effective ultrasonic wave is the second fingerprint signal. Therefore, the second fingerprint signals may be obtained by an equation set of the plurality of second fingerprint signals.

In practical application, since an ultrasonic signal reflected to the target sensing unit by the fingerprint area far from the target sensing unit is relatively weak, its influence on the fingerprint signal is negligible. Based on this, step S520 may be carried out in the following way:

According to the first fingerprint signal of the target sensing unit, a first fingerprint signal of a first remaining sensing unit and a positional relationship between the target sensing unit and the first remaining sensing unit, an interference fingerprint signal is separated from the first fingerprint signal of the target sensing unit. The first remaining sensing unit is a sensing unit in the remaining sensing units, a distance between which and the target sensing unit is less than a first preset threshold.

The first preset threshold may be measured by the number of the sensing units. For example, one sensing unit on each side of the target sensing unit is the first remaining sensing unit, or two sensing units on each side of the target sensing unit are the first remaining sensing unit, or four sensing units on each side of the target sensing unit are the first remaining sensing unit.

Since the target sensing unit is any one of the sensing units in the scanning line, all of the sensing units may be traversed in the above-mentioned way to obtain the second fingerprint signal corresponding to each of the sensing units.

For example, three sensing units shown in FIG. 9 are taken as an example, the second fingerprint signal may be obtained by calculating with the following equation set.

$$\begin{cases} R_1 = S_1 + S_2 e^{-jq1} + S_3 e^{-jq2} \\ R_2 = S_1 e^{-jq1} + S_2 + S_3 e^{-jq1} \\ R_3 = S_1 e^{-jq2} + S_2 e^{-jq1} + S_3 \end{cases}$$

Where $R_i$ is the first fingerprint signal, $S_i$ is the second fingerprint signal, and θi is phase of the interference ultrasonic wave. The first fingerprint signal is an output value of a pixel output circuit of the sensing unit in an output stage. The second fingerprint signal is unknown. The phase of the interference ultrasonic wave may be determined by the arrangement of the sensing units (that is, the positional relationship between the sensing units). The second fingerprint signal corresponding to each sensing unit may be determined by the above-mentioned equation set.

It should be noted that the number of the sensing units used for calculation may be determined according to the size of the sensing units and spacing between the adjacent sensing units in practical application.

In step S530, fingerprint recognition may be carried out according to the second fingerprint signals received by the plurality of sensing units.

A processor receives a second fingerprint signal corresponding to each pixel output unit, and can obtain the user's fingerprint image according to the plurality of second fingerprint signals and a position of the corresponding pixel output unit. The fingerprint image of the user is compared with a fingerprint image pre-stored in the display device. When the user's fingerprint image matches the pre-stored fingerprint image, the fingerprint recognition is successful; and when the user's fingerprint image does not match the pre-stored fingerprint image, the fingerprint recognition fails.

Figure 11:
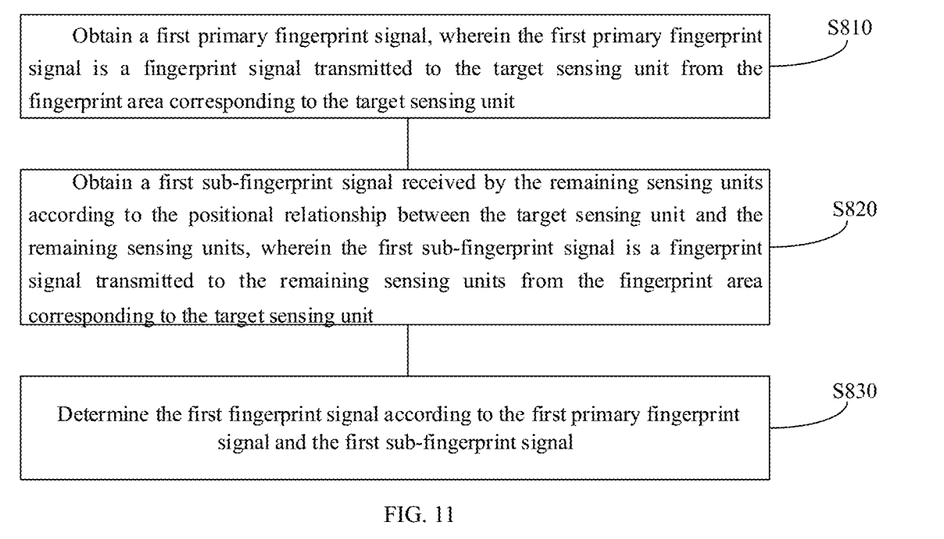
FIG. 11 is a flowchart of a second ultrasonic fingerprint recognition method provided by an exemplary embodiment of the present disclosure.

Further, in practical application, as shown in FIG. 9, the reference sign 110 denotes a sensing unit and the reference sign 400 denotes a finger. When reflecting an ultrasonic wave, the fingerprint area corresponding to the target sensing unit not only reflects the ultrasonic wave to the target sensing unit directly below the fingerprint area, but also reflects part of the ultrasonic wave to the remaining sensing units. This results in that the fingerprint signal received by the target sensing unit is only part of the fingerprint signal, which exerts an influence, to a certain degree, on the accuracy of the ultrasonic fingerprint recognition. To address this problem, as shown in FIG. 11, the ultrasonic fingerprint recognition method provided by the embodiment of the present disclosure may further include the following steps:

In step S810A, a first primary fingerprint signal is obtained, wherein the first primary fingerprint signal is a fingerprint signal transmitted to the target sensing unit from the fingerprint area corresponding to the target sensing unit.

In step S820, a first sub-fingerprint signal received by the remaining sensing units is obtained according to the positional relationship between the target sensing unit and the remaining sensing units, wherein the first sub-fingerprint signal is a fingerprint signal transmitted to the remaining sensing units from the fingerprint area corresponding to the target sensing unit.

In step S830, the first fingerprint signal is determined according to the first primary fingerprint signal and the first sub-fingerprint signal.

The first fingerprint signal is obtained by superimposing the first primary fingerprint signal received by the target sensing unit and the first sub-fingerprint signal received by the remaining sensing units, which solves the problem that the fingerprint signal received by the target sensing unit is only part of the fingerprint signal, exerting an influence, to a certain degree, on the accuracy of the ultrasonic fingerprint recognition, and improves the accuracy of the ultrasonic fingerprint recognition.

In step S810, a first primary fingerprint signal may be obtained, wherein the first primary fingerprint signal is a fingerprint signal transmitted to the target sensing unit from the fingerprint area corresponding to the target sensing unit.

For a determined display device, during fingerprint recognition, the distance between a contact surface of the fingerprint and the display device and the sensing units is the same, so the time at which the first primary fingerprint signal is received may be determined according to a timing sequence and a sound velocity of each model during the scanning. In the target sensing unit, the receiving electrode is connected to the pixel receiving circuit, and the pixel receiving circuit corresponding to the target receiving unit is connected to an output signal (that is, the first primary fingerprint signal) at the time at which the first primary fingerprint signal is received at a scanning stage.

In step S820, a first sub-fingerprint signal received by the remaining sensing units may be obtained according to the positional relationship between the target sensing unit and the remaining sensing units, wherein the first sub-fingerprint signal is the fingerprint signal transmitted to the remaining sensing units from the fingerprint area corresponding to the target sensing unit.

A receiving delay of the remaining sensing units may be determined according to the positional relationship between the target sensing unit and the remaining sensing units; the first sub-fingerprint signal is obtained after first primary fingerprint signal delay receiving delay is received. For a determined display device, during fingerprint recognition, the distance between a contact surface of the fingerprint and the display device and the sensing units is the same, time at which the remaining sensing units receive the first sub-fingerprint signal may be determined, that is, a receiving delay of the first sub-fingerprint signal is obtained, according to the positional relationship between the target sensing unit and the remaining sensing units, the sound velocity and the distance between the contact surface of the fingerprint and the display device and the sensing units. The signal received by the remaining sensing units at the time of receiving delay is taken as the first sub-fingerprint signal.

It should be noted that receiving delays of second sub-fingerprint signals corresponding to the remaining sensing units with different relative distances to the target sensing unit are different. All of the sensing units receive the first primary fingerprint signal at time at which the first primary fingerprint signal is received. At different delay time, each of the sensing units receives the first sub-fingerprint signal from the target sensing unit with the same distance to it.

Since in practical application, the first sub-fingerprint signal received by the remaining sensing units having a large distance to the target sensing unit is very weak, its influence on fingerprint recognition results is negligible. Hence, step S820 may be carried out in the way of obtaining a first sub-fingerprint signal of a second remaining sensing unit according to a positional relationship between the target sensing unit and the second remaining sensing unit. The second remaining sensing unit is a sensing unit in the remaining sensing units, whose distance to the target sensing unit is less than a second preset threshold.

The second preset threshold may be measured by the number of the sensing units within the distance. For example, one sensing unit on each side of the target sensing unit is the second remaining sensing unit, or two sensing units on each side of the target sensing unit are the second remaining sensing unit, or four sensing units on each side of the target sensing unit are the first remaining sensing unit.

Figure 10:
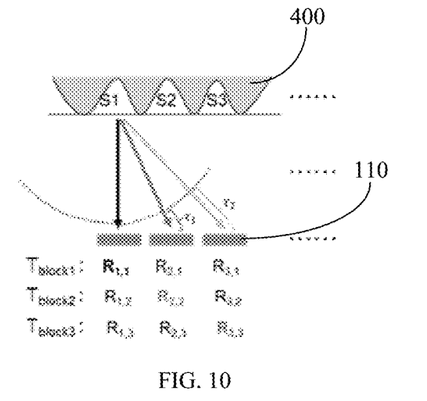
FIG. 10 is a diagram of the reflection of another ultrasonic wave provided by an exemplary embodiment of the present disclosure.

Exemplarily, the two second remaining sensing units as shown in FIG. 10 may collect the first primary fingerprint signal at time Tblock1, the first sub-fingerprint signal with a distance of one sensing unit at time Tblock2, and the second sub-fingerprint signal with a distance of two sensing units at time Tblock3, respectively. Its results are as follows:

| Tblock1:R11 | R21 | R31 |
| Tblock1:R12 | R22 | R32 |
| Tblock2:R13 | R23 | R33 |

In step S830, the first fingerprint signal may be determined according to the first primary fingerprint signal and the first sub-fingerprint signal.

It may be specifically carried out in the way of superimposing the first primary fingerprint signal and the plurality of first sub-fingerprint signals to obtain the first fingerprint signal.

For example, on the basis of the above-mentioned delay detection results, the first fingerprint signal of a first target sensing unit is $R_1=R_{1,1}+R_{2,2}+R_{3,3}$. It should be noted that in this example, description will be made by taking one side as an example, the first sub-fingerprint signal may be collected on both sides of the target sensing unit by taking the symmetry of the distribution of the sensing units into account in practical application.

Figure 12:
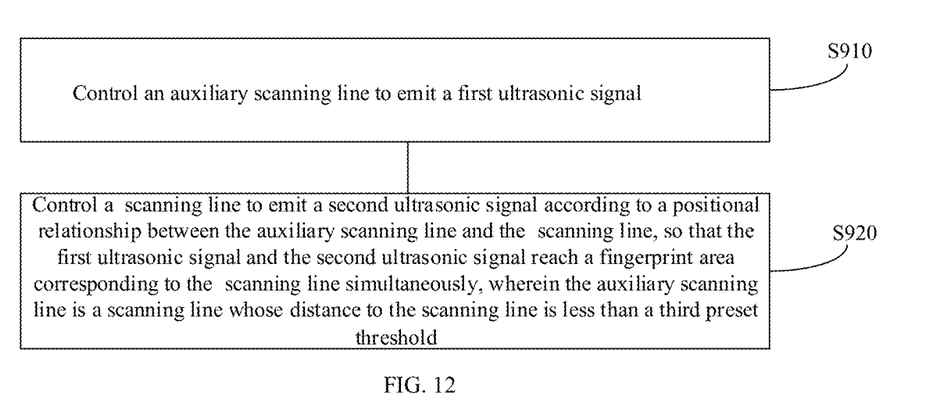
FIG. 12 is a flowchart of a third ultrasonic fingerprint recognition method provided by an exemplary embodiment of the present disclosure.
Figure 13:
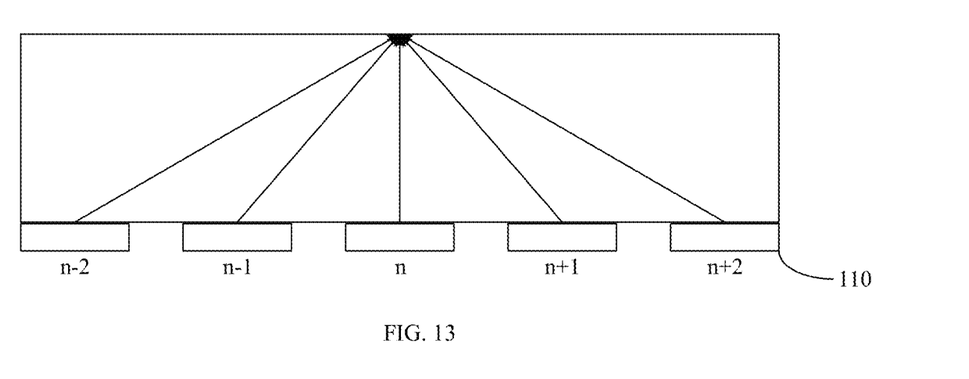
FIG. 13 is a diagram of the emission of an ultrasonic wave provided by an exemplary embodiment of the present disclosure.

Further, since line-by-line scanning is performed during scanning, the intensity of an ultrasonic wave emitted by the sensing units during one-line scanning is relatively weak, so adjacent idle rows of emission electrodes (That is, auxiliary scanning line s adjacent to the scanning line) may emit an ultrasonic wave together, and the ultrasonic wave may be enhanced by multi-row focused emission of the ultrasonic wave. In order to achieve multi-row focused emission, as shown in FIGS. 12-13, according to the ultrasonic fingerprint recognition method provided by the embodiment of the present disclosure, emitting ultrasonic waves in a row focused manner may include the following steps.

In step S910, an auxiliary line is controlled to emit a first ultrasonic signal.

In step S920, a scanning line is controlled to emit a second ultrasonic signal according to a positional relationship between the scanning line and the auxiliary scanning line, so that the first ultrasonic signal and the second ultrasonic signal can reach a fingerprint area corresponding to the scanning line simultaneously. The auxiliary scanning line is a scanning line whose distance to the above said scanning line is less than a third preset threshold. The third preset threshold may be measured by the number of scanning lines. For example, one scanning line on each side of the scanning line is the auxiliary scanning line, or two scanning lines on each side of the scanning line are the auxiliary scanning lines, or four scanning lines on each side of the scanning line are the auxiliary scanning lines.

The scanning line is controlled to emit the second ultrasonic signal on the basis of the positional relationship between the scanning line and the auxiliary scanning line. The first ultrasonic signal and the second ultrasonic signal are irradiated to the fingerprint area together to achieve the enhancement of the ultrasonic wave.

In step S910, the auxiliary scanning line (taking the (n+2)th row and (n−2)th row shown in FIG. 3 as examples) may be controlled to emit the first ultrasonic signal.

After an excitation signal is received by an emission electrode of the auxiliary scanning line, the excitation signal is converted into an ultrasonic wave by the sensing unit, which propagates to a fingerprint recognition area, that is, the fingerprint area corresponding to the scanning line (taking the nth row shown in FIG. 3 as an example) and is reflected by the fingerprint.

In step S920, the scanning line may be controlled to emit a second ultrasonic signal according to the positional relationship between the scanning line and the auxiliary scanning line. The scanning line and its corresponding fingerprint area coincide in the vertical direction, that is, the scanning line is located directly under the corresponding fingerprint area.

In a feasible embodiment, step S920 may be carried out in the way of determining an propagation delay of each auxiliary scanning line for emitting a first ultrasonic wave according to the positional relationship between the scanning line and the auxiliary scanning line; and controlling the auxiliary scanning line to emit the second ultrasonic signal according to the propagation delay of each auxiliary scanning line for emitting the first ultrasonic wave.

As shown in FIG. 12, a transmission distance of the ultrasonic wave of the auxiliary scanning line to a target fingerprint area is greater than a distance of the scanning line, that is, time taken for emission from the auxiliary scanning line to the target fingerprint area is greater than time taken for emission from the scanning line to the target fingerprint area. In order to emit the ultrasonic wave to the target fingerprint area simultaneously, the auxiliary scanning line may emit the first ultrasonic signal at first, and the further the distance to the scanning line is, the earlier the emission time of the auxiliary scanning line is.

Based on the propagation delay of the first ultrasonic wave emitted by each auxiliary scanning line, the scanning line is controlled to transmit the second ultrasonic signal, so that the first ultrasonic wave and the second ultrasonic wave simultaneously propagate to the fingerprint area corresponding to the scanning line and are reflected by the fingerprint. Ultrasonic wave enhancement is achieved by multi-row focused emission of ultrasonic waves.

The auxiliary scanning line refers to several scanning lines adjacent to the scanning line. Taking FIG. 3 as an example, the nth line is the scanning line, the (n−2) line, (n+2) line, and the (n−1) line and (n+1) line are auxiliary scanning lines. Their propagation delays are shown in FIG. 3. Lines (n−2) and (n+2) have maximum propagation delays, lines n−1 and n+1 have the secondly propagation delay, and line n has minimal propagation delay. The (n−2) row of emission electrodes and (n+2) row of emission electrodes can be controlled to emit ultrasonic signals first, followed the by (n−2) row of emission electrodes and (n+2) row of emission electrodes, and finally the nth row of emission electrodes to emit ultrasonic signals. So that the ultrasonic waves emitted by the (n−2)th row of emission electrodes and (n+2)th row of emission electrodes, the (n−1)th row of emission electrodes and (n+1)th row of emission electrodes and the nth row of emission electrodes are focused on the area above the nth row, that is the fingerprint area corresponding to the scanning line, and are reflected by the fingerprint to enhance the ultrasonic waves.

It should be noted that, although the various steps of the method of the present disclosure are described in a particular order in the figures, it is not required or implied that the steps must be performed in the particular order, or all of the illustrated steps must be performed to achieve the desired result. Additionally or alternatively, some of the steps may be omitted, or multiple steps may be combined into one step to be performed, and/or one step is decomposed into multiple steps to be performed.

Figure 14:
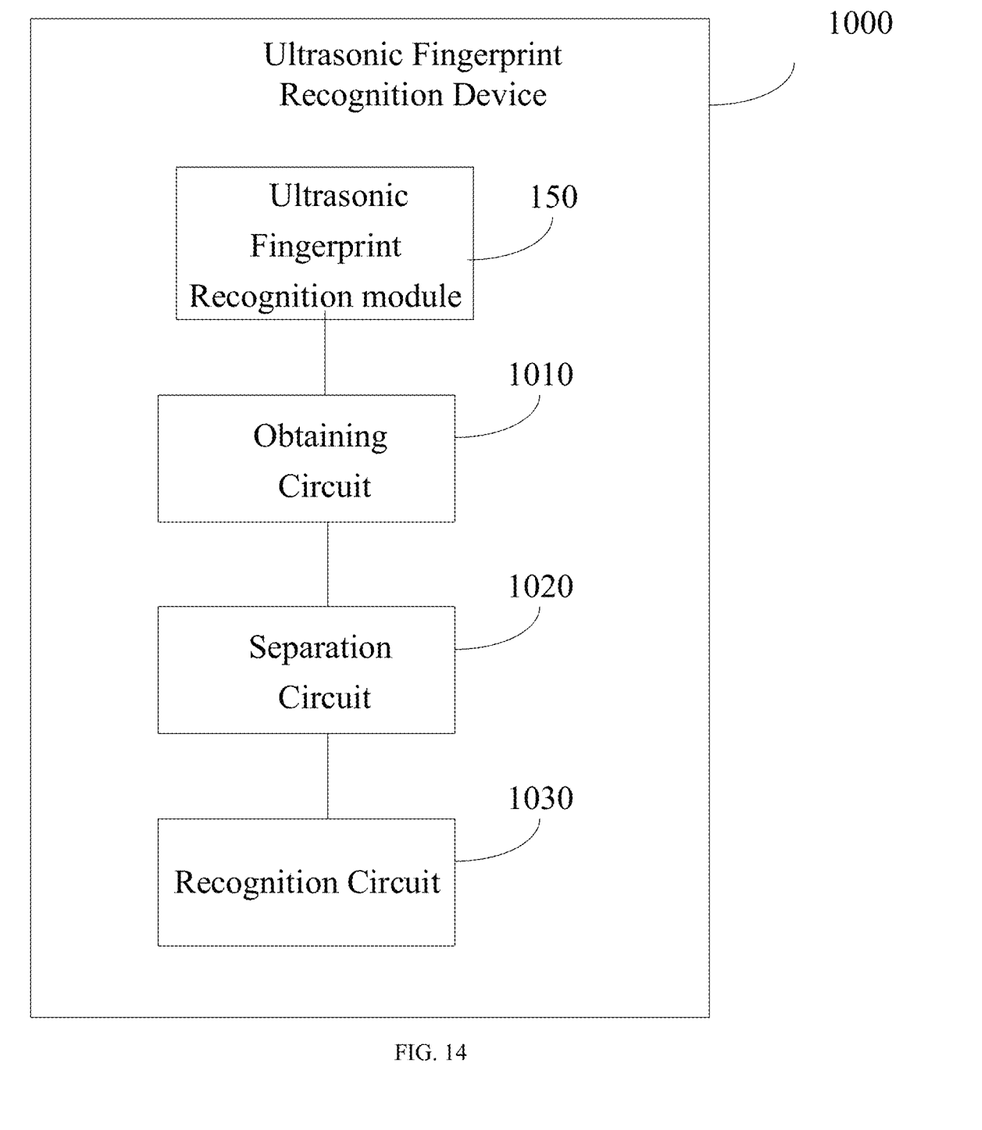
FIG. 14 is a block diagram of an ultrasonic fingerprint recognition device provided by an exemplary embodiment of the present disclosure.

An exemplary embodiment of the present disclosure also provides an ultrasonic fingerprint recognition system 1000 for a display device including the above described ultrasonic fingerprint module, which includes a plurality of sensing units distributed in array. As shown in FIG. 14, the ultrasonic fingerprint recognition device 1000 includes an obtaining circuit 1010, a separation circuit 1020 and a recognition circuit 1030.

The obtaining circuit 1010 is connected to the ultrasonic fingerprint module and configured to obtain a first fingerprint signal received by each of sensing units in a scanning line. The scanning line includes a plurality of sensor units including a row of emission electrode and composed of a plurality of receiving electrodes corresponding to the row of emission electrode.

The separation circuit 1020 is connected to obtaining circuit 1010 and configured to, according to the first fingerprint signals and a positional relationship between a target sensing unit and the remaining sensing units, separate an interference fingerprint signal from a first fingerprint signal of the target sensing unit to obtain a second fingerprint signal. The target sensing unit is any of the sensing units in the scanning line. The remaining sensing units are sensing units other than the target sensing unit in the scanning line. The interference fingerprint signal is a fingerprint signal transmitted to the target sensing unit from fingerprint areas corresponding to the remaining sensing units.

The recognition circuit 1030 is connected to separation circuit 1020 and configured to perform fingerprint recognition according to the second fingerprint signal received by the plurality of sensing units.

In the ultrasonic fingerprint recognition device provided by the embodiment of the present disclosure, the first fingerprint signal received by each of the sensing units in the scanning line is obtained; according to the plurality of first fingerprint signals and the positional relationship between the target sensing unit and the remaining sensing units, the interference fingerprint signal is separated from the first fingerprint signal of the target sensing unit to obtain the second fingerprint signal; and the fingerprint recognition is performed according to the second fingerprint signals received by the plurality of sensing units. Therefore, an ultrasonic wave reflected to the target sensing unit from other areas is separated from the ultrasonic signal received by the sensing units, which reduces the influence of the ultrasonic wave reflected from other areas on a recognition result, and improves the accuracy of ultrasonic fingerprint recognition.

The concrete details of the modules of the ultrasonic fingerprint recognition device described above have been described in detail in the corresponding method for transmitting a virtual object, which will not be elaborated here.

It should be noted that although several circuits of the ultrasonic fingerprint recognition device are mentioned in the detailed descriptions above, such division is not mandatory. In fact, features, and functions of two or more circuits described above may be embodied in one circuit in accordance with the embodiments of the present disclosure. Conversely, features and functions of circuit described above may be further embodied by multiple circuits.

In addition, in an exemplary embodiment of the present disclosure, there is also provided a display device capable of implementing the above-mentioned method.

Those skilled in the art can understand that all aspects of the invention may be implemented as systems, methods, or program products. Therefore, all aspects of the present invention may be embodied as complete hardware embodiments, complete software embodiments (including firmware, microcode, etc.), or embodiments with hardware and software combined, which may be collectively referred to here as "circuits", "modules" or "systems".

A display device 200 according to the embodiment of the invention is described below with reference to FIG. 15. The display device 200 shown in FIG. 15 is only an example and shall not impose any restrictions on the function and scope of application of the embodiment of the invention.

Figure 15:
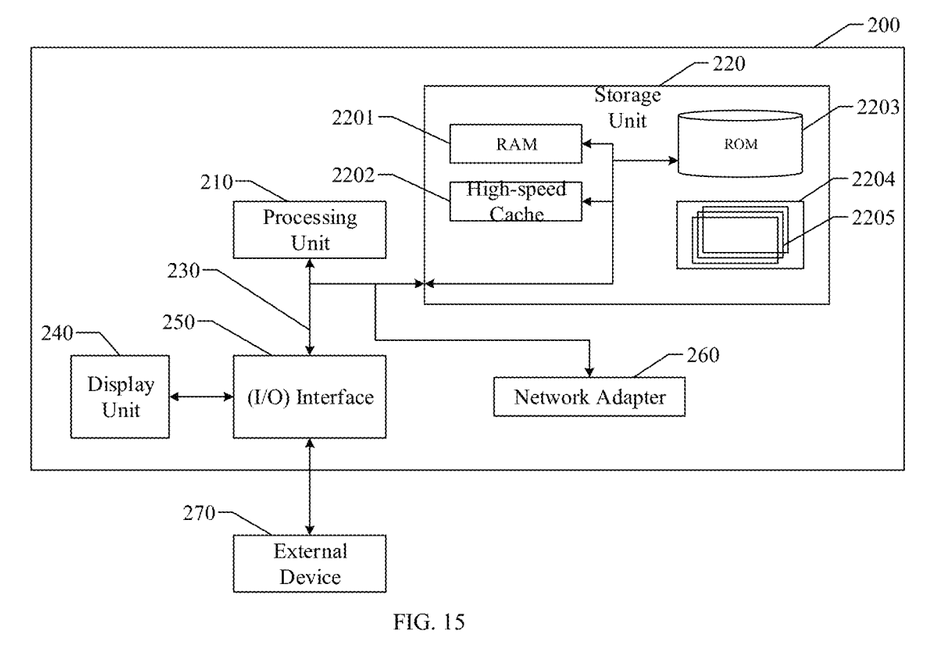
FIG. 15 is a diagram of another electronic device provided by an exemplary embodiment of the present disclosure.

As shown in FIG. 15, the display device 200 is represented in the form of a general-purpose computing device. Components of the display device 200 may include, but are not limited to, at least one processing unit 210 described above, at least one storage unit 220 described above, a bus 230 connecting different system components (including a storage unit 220 and a processing unit 210), a display unit 240.

The storage unit is stored with program codes which, when executed by the processing unit 210, cause the processing unit 210 to perform the steps according to various exemplary embodiments of the present invention described in the "exemplary method" described above in the specification.

The storage unit 220 may include a readable medium in the form of volatile storage unit, such as a random access memory (RAM) 2201 and/or a high-speed cache storage unit 2202, and it may further include a read-only memory (ROM) 2203.

The storage unit 220 may also include a program/utility 2204 having a set of (at least one) program module 2205. Such program module 2205 includes, but is not limited to, an operating system, one or more applications, other program modules, and program data, each or a combination of the examples may include the implementation of a network environment.

The bus 230 may be one or more of several types of bus structures, including a storage unit bus or a storage unit controller, a peripheral bus, an accelerated graphics port, a processing unit, or a local bus using any of the bus structures.

The display device 200 may communicate with one or more external devices 270 (e.g. a keyboard, a pointing device, a Bluetooth device), or may communicate with one or more devices that enable the user to interact with the display device 200, and/or communicate with any apparatus (e.g. a router, a modem, etc.) that enables the display device 200 to communicate with one or more other computing devices. The communication may be carried out through an input/output (I/O) interface 250. Moreover, the display device 200 may also communicate with one or more networks (such as a Local Area Network (LAN), a Wide Area Network (WAN) and/or a public network, e.g. Internet) via a network adapter 260. As shown in the figure, the network adapter 260 communicates with other modules of the display device 200 via the bus 230. It should be noted that although not shown in the figure, other hardware and/or software modules may be used in conjunction with the display device 200, including, but not limited to, a microcode, a device driver, a redundancy processing unit, an external disk drive array, an RAID system, a tape drive, and a data backup storage system.

Through the description of the above-mentioned embodiments, it is easy for those skilled in the art to understand that the exemplary embodiments described here may be implemented by software or by software in combination with necessary hardware. Therefore, the technical solution of the embodiments of the present disclosure may be embodied in the form of a software product which may be stored in a non-volatile, non-transitory computer-readable storage medium (such as a CD-ROM, a USB flash disk, or mobile hard disk) or on a network and which may include several instructions to enable a computing device (such as a personal computer, a server, a terminal device, or a network device) to implement the method according to the embodiments of the present disclosure.

In an exemplary embodiment of the present disclosure, there is also provided a non-transitory computer-readable storage medium stored thereon with a program product capable of implementing the method described above in the specification. In some possible embodiments, various aspects of the present invention may also be implemented in the form of a program product, which includes program code and/or program instructions. When the program product is running on a terminal device, the program code and/or program instructions cause the terminal device to perform the steps according to various exemplary embodiments of the present invention described in an example method described above in the specification.

Figure 16:
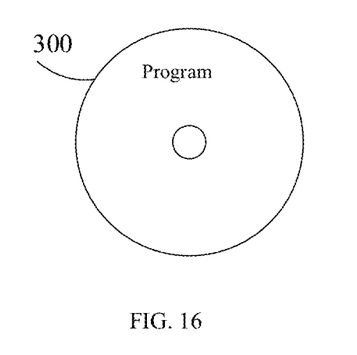
FIG. 16 is a diagram of a computer-readable storage medium provided by an exemplary embodiment of the present disclosure.

Referring to FIG. 16, a program product 300 for implementing the above-mentioned method according to an embodiment of the present invention is described. The program product 300 may use a portable compact disk read-only memory (CD-ROM), and include program codes and may be running on a terminal device, such as a personal computer. However, the program product of the present invention is not limited to this. In this document, a readable storage medium may be any tangible medium containing or storing a program, which may be used by or used in combination with a command execution system, apparatus, or device.

The program product may adopt any combination of one or more readable media. A readable medium may be a readable signal medium or a readable storage medium. The readable storage medium may be, for example, but not limited to, electrical, magnetic, optical, electromagnetic, infrared, or semiconductor systems, apparatuses or devices, or any combination thereof. More specific examples (non-exhaustive list) of the readable storage medium include: electrical connections with one or more wires, a portable disk, a hard disk, a random access memory (RAM), a read-only memory (ROM), an erasable programmable read-only memory (EPROM or flash), an optical fiber, a portable compact disk read-only memory (CD-ROM), an optical storage device, a magnetic storage device, or any suitable combination thereof.

A computer-readable signal medium may include a data signal transmitted in a baseband or as part of a carrier, which carries a readable program code. The transmitted data signal may be represented in many forms, including, but not limited to, an electromagnetic signal, an optical signal, or any suitable combination thereof. The readable signal medium may also be any readable medium other than a readable storage medium, which may send, propagate, or transmit programs which are used by, or used in conjunction with a command execution system, apparatus, or device.

Program codes contained on a readable medium may be transmitted with any appropriate medium, which includes, but is not limited to, wireless, wired, an optical cable, RF, etc., or any suitable combination thereof.

Program codes for performing an operation of the present invention may be written in any combination of one or more programming languages, which include object-oriented programming languages such as Java, C++, conventional procedural programming languages such as "C" language or similar programming languages. The program codes may be executed entirely on a user computing device, partially on a user device, as a separate software package, partially on a user computing device and partially on a remote computing device, or entirely on a remote computing device or a server. In the case where a remote computing device is involved, the remote computing device may be connected to a user computing device through any kind of network, including a local area network (LAN) or a wide area network (WAN), or may be connected to an external computing device (for example, through the internet by using an internet service provider).

In addition, the above-mentioned drawings are only schematic descriptions of processes included in the method according to exemplary embodiments of the present invention, and are not restrictive of the invention. It is easily understood that the processes shown in the above-mentioned drawings do not indicate or limit the chronological order of the processes. It is also easily understood that the processes may be performed synchronously or asynchronously, for example, in a plurality of modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An ultrasonic fingerprint recognition module, comprising:
   a plurality of sensing units distributed in array, wherein the plurality of sensing units comprise:
      a receiving electrode layer having a plurality of receiving electrodes distributed in array;
      a piezoelectric material layer disposed on a side of the receiving electrode layer;
      an emission electrode layer disposed on a side of the piezoelectric material layer distal to the receiving electrode layer, and comprising a plurality of rows of emission electrodes;
      a selection circuit having an input terminal connected to an excitation signal and an output terminal connected to the emission electrode for selecting to transmit the excitation signal to the plurality of emission electrodes;
      a pixel receiving circuit connected to the receiving electrode layer that receives a fingerprint signal;
      an obtaining circuit connected to the ultrasonic fingerprint recognition module and configured to obtain a first fingerprint signal received by each of the sensing units in a scanning line;
      a separation circuit connected to the obtaining circuit and configured to, according to the plurality of first fingerprint signals and a positional relationship between a target sensing unit and the remaining sensing units, separate an interference fingerprint signal from the first fingerprint signal of the target sensing unit to obtain a second fingerprint signal, wherein the target sensing unit is any of the sensing units in the scanning line, the remaining sensing units are sensing units other than the target sensing unit in the scanning line, and the interference fingerprint signal is a fingerprint signal transmitted to the target sensing unit from fingerprint areas corresponding to the remaining sensing units; and
      a recognition circuit connected to the separation circuit and configured to perform fingerprint recognition according to the second fingerprint signals received by the plurality of sensing units.

2. The ultrasonic fingerprint recognition module according to claim 1, wherein each row of the emission electrodes is separated from each other and corresponds to a plurality of the receiving electrodes, and each row of the emission electrodes shares electrode plates of a plurality of receiving electrodes corresponding with each row of the emission electrodes.

3. The ultrasonic fingerprint recognition module according to claim 2, wherein orthographic projections of the plurality of receiving electrodes corresponding with each row of the emission electrodes on the piezoelectric material layer are within an orthographic projection of each row of the emission electrodes.

4. The ultrasonic fingerprint recognition module according to claim 1, wherein a width of each row of the emission electrodes is 50-200 μm, and an interval between each row of the emission electrodes and its adjacent row of the emission electrodes is 1-10 μm.

5. The ultrasonic fingerprint recognition module according to claim 2, wherein the plurality of rows of emission electrodes are connected to the selection circuit such that connecting lines are leaded from the same side of the emission electrodes.

6. The ultrasonic fingerprint recognition module according to claim 2, wherein the plurality of rows of emission electrodes are connected to the selection circuit such that connecting lines are leaded from left side or right side of the emission electrodes alternately.

7. An ultrasonic fingerprint recognition method, comprising:
   providing an ultrasonic fingerprint recognition module comprising a plurality of sensing units distributed in array, the plurality of sensing units comprising:
      a receiving electrode layer having a plurality of receiving electrodes distributed in array;
      a piezoelectric material layer disposed on a side of the receiving electrode layer;
      an emission electrode layer disposed on a side of the piezoelectric material layer distal to the receiving electrode layer, and comprising a plurality of rows of emission electrodes;
      a selection circuit having an input terminal which is connected with an excitation signal and an output terminal which is connected with the emission electrode for selecting to transmit the excitation signal to the plurality of emission electrodes; and
      a pixel receiving circuit connected to the receiving electrode layer that receives a fingerprint signal;
   emitting ultrasonic waves by a scanning line in a row focused manner, the scanning line comprising a plurality of sensor units comprising a row of emission electrode and a plurality of receiving electrodes corresponding to the row of emission electrode; and
   receiving and recognizing the ultrasonic waves emitted by the scanning line in a column focused manner, wherein receiving and recognizing the ultrasonic waves emitted by the scanning line in the column focused manner comprises:
      obtaining a first fingerprint signal received by each of the sensing units in the scanning line;
      separating an interference fingerprint signal from the first fingerprint signal of a target sensing unit according to the plurality of first fingerprint signals and a positional relationship between the target sensing unit and the remaining sensing units, to obtain a second fingerprint signal, wherein the target sensing unit is any of the sensing units in the scanning line, the remaining sensing units are sensing units other than the target sensing unit in the scanning line, and the interference fingerprint signal is a fingerprint signal transmitted to the target sensing unit from fingerprint areas corresponding to the remaining sensing units; and
      performing fingerprint recognition according to the second fingerprint signals received by the plurality of sensing units.

8. The ultrasonic fingerprint recognition method according to claim 7, wherein separating the interference fingerprint signal from the first fingerprint signal of the target sensing unit according to the plurality of first fingerprint signals and the positional relationship between the target sensing unit and the remaining sensing units comprises:
   separating the interference fingerprint signal from the first fingerprint signal of the target sensing unit according to the first fingerprint signal of the target sensing unit, a first fingerprint signal of a first remaining sensing unit and a positional relationship between the target sensing unit and the first remaining sensing unit, wherein the first remaining sensing unit is a sensing unit in the remaining sensing units, whose distance to the target sensing unit is less than a first preset threshold.

9. The ultrasonic fingerprint recognition method according to claim 7, wherein the method further comprises:
   obtaining a first primary fingerprint signal, wherein the first primary fingerprint signal is a fingerprint signal transmitted to the target sensing unit from a fingerprint area corresponding to the target sensing unit;
   obtaining a first sub-fingerprint signal received by the remaining sensing units according to the positional relationship between the target sensing unit and the remaining sensing units, wherein the first sub-fingerprint signal is a fingerprint signal transmitted to the remaining sensing units from the fingerprint area corresponding to the target sensing unit; and
   determining the first fingerprint signal according to the first primary fingerprint signal and the first sub-fingerprint signal.

10. The ultrasonic fingerprint recognition method according to claim 9, wherein obtaining the first sub-fingerprint signal according to the positional relationship between the target sensing unit and the remaining sensing units comprises:
    determining a receiving delay of the remaining sensing units according to the positional relationship between the target sensing unit and the remaining sensing units; and
    obtaining the first sub-fingerprint signal after receiving delay receiving delay of the first primary fingerprint signal.

11. The ultrasonic fingerprint recognition method according to claim 10, wherein determining the first fingerprint signal according to the first primary fingerprint signal and the first sub-fingerprint signal comprises: superposing the first primary fingerprint signal and the plurality of first sub-fingerprint signals to obtain the first fingerprint signals.

12. The ultrasonic fingerprint recognition method according to claim 10, wherein receiving the first sub-fingerprint signal according to the positional relationship between the target sensing unit and the remaining sensing units comprises: obtaining a first sub-fingerprint signal of a second remaining sensing unit according to a positional relationship between the target sensing unit and the second remaining sensing unit, wherein the second remaining sensing unit is a sensing unit in the remaining sensing units, whose distance to the target sensing unit is less than a second preset threshold.

13. The ultrasonic fingerprint recognition method according to claim 7, wherein emitting ultrasonic waves by a scanning line in a row focused manner comprises:
    controlling an auxiliary scanning line to emit a first ultrasonic signal; and
    controlling the scanning line to emit a second ultrasonic signal according to a positional relationship between the auxiliary scanning line and the scanning line, so that the first ultrasonic signal and the second ultrasonic signal reach a fingerprint area corresponding to the scanning line simultaneously, wherein the auxiliary scanning line is a scanning line, whose distance to the scanning line is less than a third preset threshold.

14. The ultrasonic fingerprint recognition method according to claim 13, wherein controlling the scanning line to emit the second ultrasonic signal according to the positional relationship between the scanning line and the auxiliary scanning line comprises:
   determining a propagation delay of the auxiliary scanning line for emitting the first ultrasonic wave according to the positional relationship between the scanning line and the auxiliary scanning line; and
   controlling the scanning line to emit the second ultrasonic signal according to the propagation delay of the auxiliary scanning line for emitting the first ultrasonic wave.

15. An ultrasonic fingerprint recognition system, comprising:
   an ultrasonic fingerprint recognition circuit comprising a plurality of sensing units distributed in array, wherein the plurality of sensing units comprise:
      a receiving electrode layer having a plurality of receiving electrodes distributed in array;
      a piezoelectric material layer disposed on a side of the receiving electrode layer;
      an emission electrode layer disposed on a side of the piezoelectric material layer distal to the receiving electrode layer, and comprising a plurality of rows of emission electrodes;
      a selection circuit having an input terminal which is connected with an excitation signal and an output terminal which is connected with the emission electrode for selecting to transmit the excitation signal to the plurality of emission electrodes; and
      a pixel receiving circuit connected to the receiving electrode layer that receives a fingerprint signal;
   an obtaining circuit connected to the ultrasonic fingerprint recognition module and configured to obtain a first fingerprint signal received by each of the sensing units in a scanning line;
   a separation circuit connected to the obtaining circuit and configured to, according to the plurality of first fingerprint signals and a positional relationship between a target sensing unit and the remaining sensing units, separate an interference fingerprint signal from the first fingerprint signal of the target sensing unit to obtain a second fingerprint signal, wherein the target sensing unit is any of the sensing units in the scanning line, the remaining sensing units are sensing units other than the target sensing unit in the scanning line, and the interference fingerprint signal is a fingerprint signal transmitted to the target sensing unit from fingerprint areas corresponding to the remaining sensing units; and
   a recognition circuit connected to the separation circuit and configured to perform fingerprint recognition according to the second fingerprint signals received by the plurality of sensing units.

* * * * *